United States Patent

[11] 3,589,563

| [72] | Inventors | John F. Carragan<br>Woodbury;<br>Sebastian A. Vecca, Waterbury, both of,<br>Conn. |
|---|---|---|
| [21] | Appl. No. | 848,982 |
| [22] | Filed | Aug. 11, 1969 |
| [45] | Patented | June 29, 1971 |
| [73] | Assignee | General Time Corporation<br>Stamford, Conn. |

[54] LONG PERIOD BATTERY-OPERATED AEROSOL DISPENSER
11 Claims, 9 Drawing Figs.

[52] U.S. Cl. .................................................. 222/70, 239/70
[51] Int. Cl. .................................................. B67d 5/08, G04c 23/38
[50] Field of Search.......................................... 239/70; 222/70

[56] References Cited
UNITED STATES PATENTS

| 3,018,056 | 1/1962 | Montgomery | 239/70 |
| 3,187,949 | 6/1965 | Mangel | 222/70 |
| 3,318,159 | 5/1967 | Cielaszyk | 239/70 X |
| 3,368,717 | 2/1968 | Weber | 222/70 |
| 3,398,863 | 8/1968 | Kolodziej | 239/70 X |
| 3,411,670 | 11/1968 | Mangel | 239/70 X |

*Primary Examiner*—Lloyd L. King
*Attorney*—Pennie, Edmonds, Morton, Taylor & Adams ABSTRACT: An automatic aerosol dispenser for producing periodic discharge from an aerosol container at long, accurately determined time intervals on the order of 15 minutes or more and which is completely self-contained, operating on low battery voltage on the order of 3 volts. The time interval is determined by an RC circuit having a long-time constant, with a transistor detector-amplifier, including feedback, for initiating a cycle of motor rotation. The capacitor of the RC circuit is restored to reference condition in an RC circuit of short-time constant. An electromechanical driving arrangement is disclosed which is particularly suited for low-voltage operation.

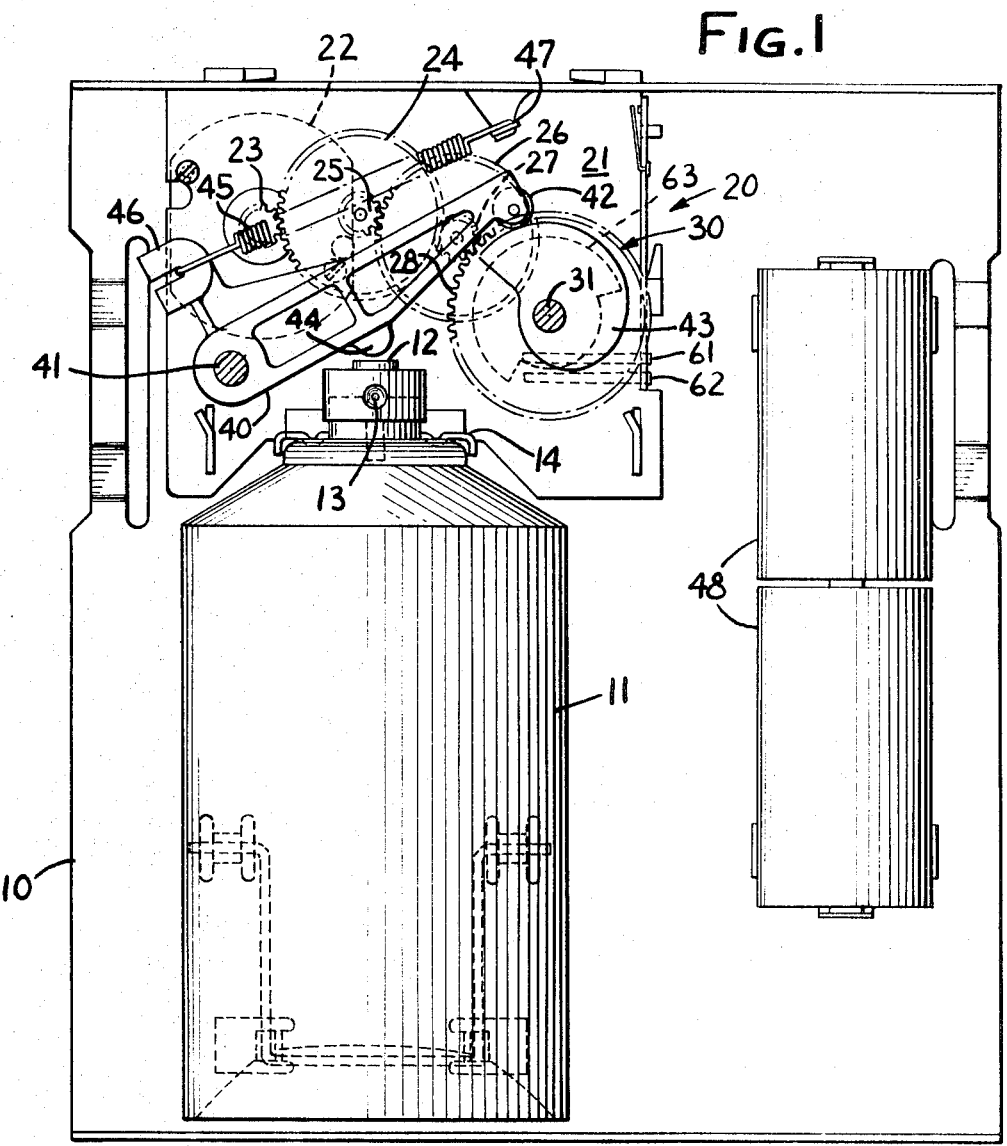
Fig. 1
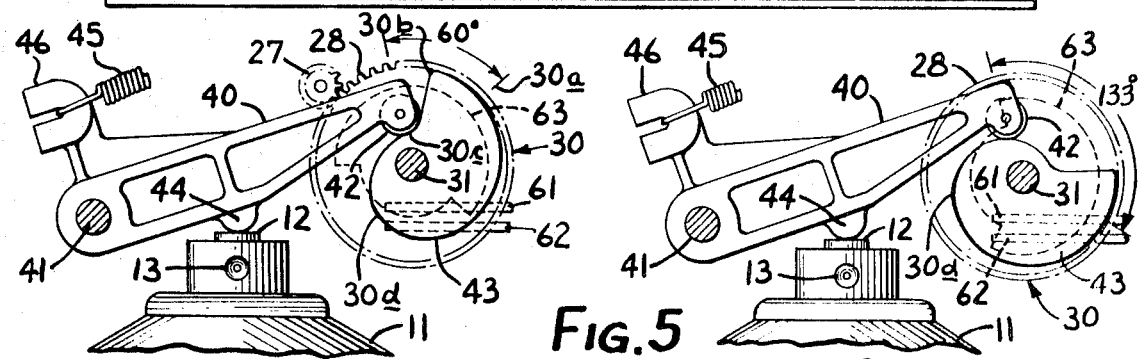
Fig. 4
FULL DROP-OFF @ 60°
DISPENSER ON
Fig. 5
SW ON @ 133°
INVENTORS
JOHN F. CARRAGAN
SEBASTIAN A. VECCA
by: Wolfe, Hubbard, Voit & Osann
ATTYS.

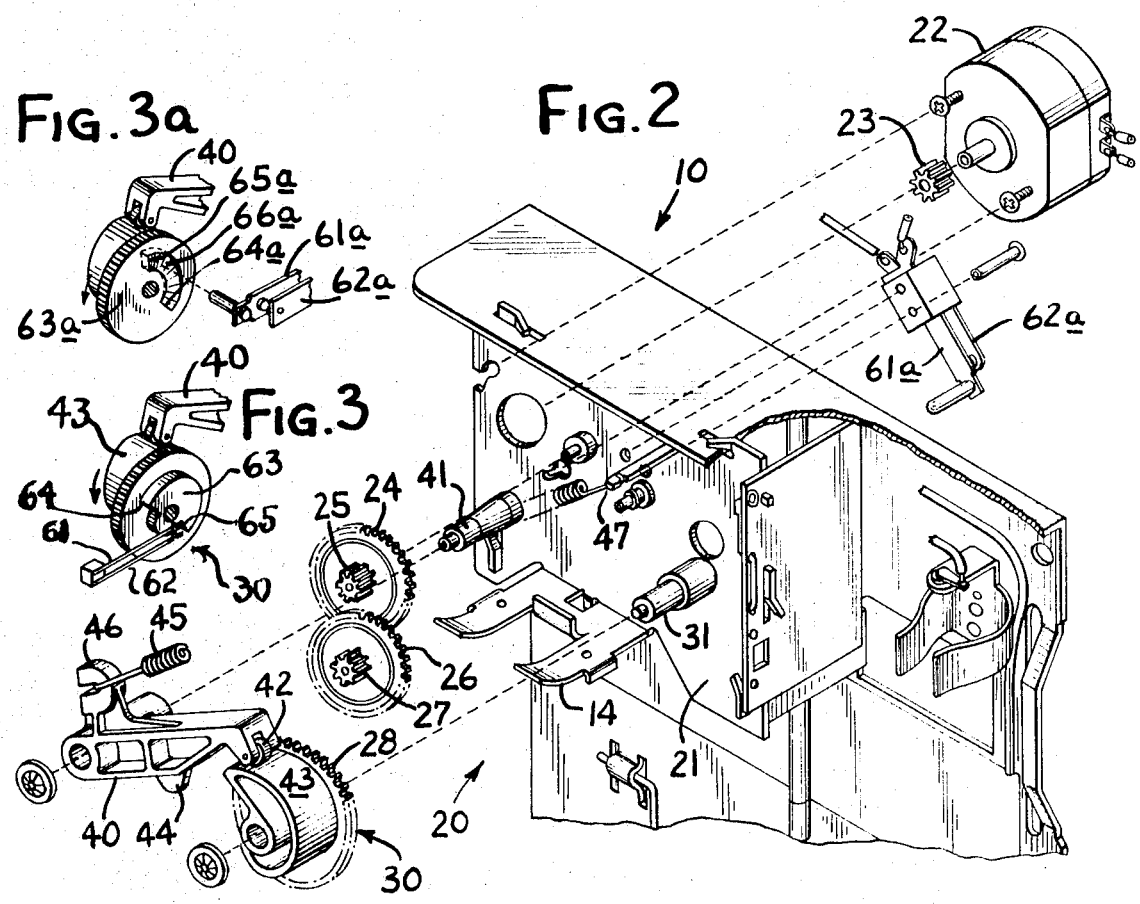
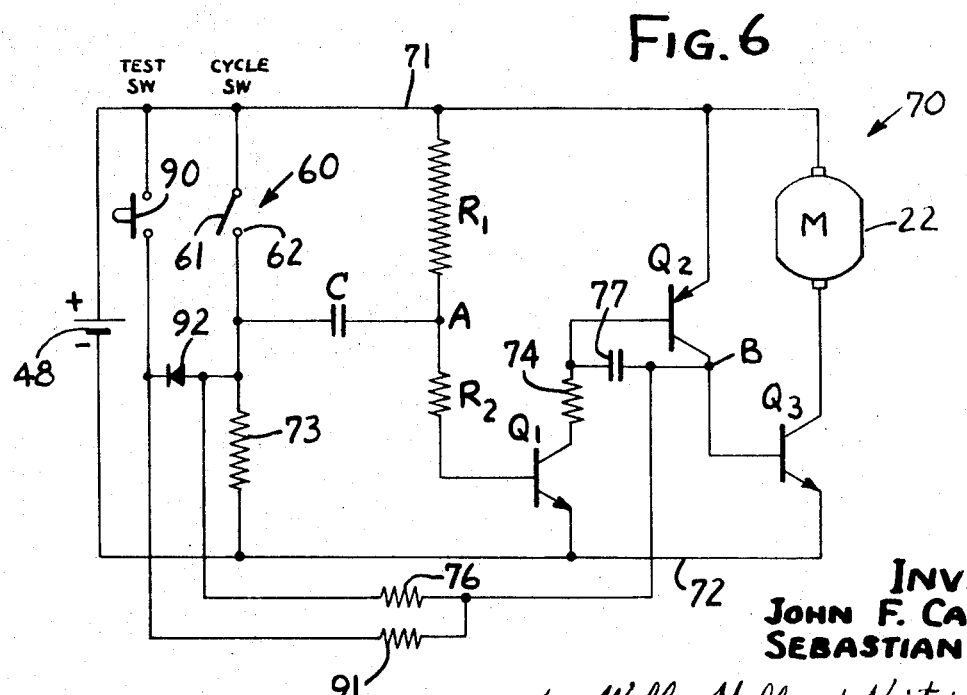

INVENTORS
JOHN F. CARRAGAN
SEBASTIAN A. VECCA by: Wolfe, Hubbard, Voit & Osann
ATTYS.

LONG PERIOD BATTERY-OPERATED AEROSOL DISPENSER

It is an object of the invention to provide a long-period battery-operated aerosol dispenser utilizing a low battery voltage on the order of 3 volts, conveniently obtained from a pair of dry cells, which is, nonetheless, consistent and reliable and which is capable of operating unattended for weeks or months at a time. It is a related object to provide a long-period aerosol dispenser which is highly efficient, drawing a negligible current from the battery during the standby portion of the cycle and presenting an extremely low-peak load to the battery during the brief period of aerosol discharge.

It is more specifically an object of the present invention to provide a timing circuit for a long-period aerosol dispenser in which a motor is provided to operate the aerosol valve and to operate a commutating switch for switching between an RC circuit of long-time constant, which serves to measure the standby time interval, and an RC circuit of short-time constant, which is effective during the brief period of discharge, to restore the capacitor to a reference condition in readiness for measurement of the subsequent standby interval.

It is a general object of the present invention to provide an aerosol dispenser which is capable of accurate measurement of long time intervals and which operates decisively notwithstanding use of a battery voltage which is lower than that employed in aerosol dispensers of more conventional design.

It is finally an object of the invention to provide an aerosol dispenser which is capable of reliable long-period cycling of an aerosol container but which, both electrically and mechanically, is inherently simple and inexpensive, requiring little or no maintenance, and which is capable of use with standard or "metered valve" aerosol containers dispensing a wide variety of aerosol materials.

Other objects and advantages of the invention will become apparent upon reading the attached detailed description and upon reference to the drawings in which:

FIG. 1 is a view in elevation of an aerosol dispenser constructed in accordance with the present invention and with the outer housing removed for the purpose of revealing internal detail;

FIG. 2 is an exploded view of the mechanical portion of the device shown in FIG. 1;

FIG. 3 is a fragmentary back view of one version of cycling switch employed in the device of FIGS. 1 and 2;

FIG. 3a is a fragmentary back view of an alternative cycling switch construction;

FIG. 4 is a stop motion view showing dropoff of the actuating arm;

FIG. 5 is a stop motion view taken a short time later showing the turning on of the cycling switch;

FIG. 6 is a schematic diagram showing the electrical circuit of the device in the preceding figures;

Figure 7:
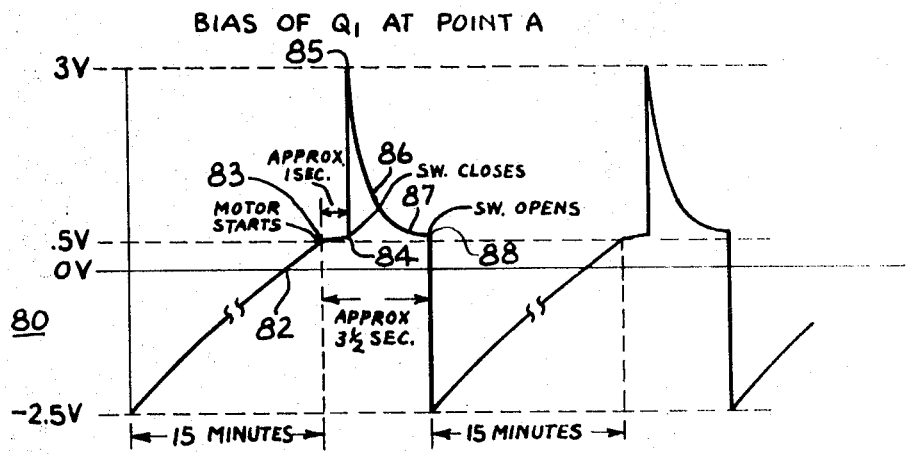
FIG. 7 shows the variation in control voltage within two successive operating cycles.

While the invention has been described in connection with certain preferred embodiments, it will be understood that we do not intend to be limited thereto, but intend on the contrary to cover the various alternative and equivalent constructions included within the spirit and scope of the invention.

Turning now to FIGS. 1 and 2, there is shown an aerosol dispenser 10 having an aerosol container 11 of conventional type mounted therein with a depressible cap 12 which controls discharge from an orifice 13. The container 11 is mounted so as to be pressed upwardly with its neck socketed against a seating surface 14.

For the purpose of periodically depressing the cap 12, for a few seconds following each standby interval, which be on the order of 15 minutes, an actuating mechanism 20 is provided mounted on a frame plate 21. The actuating mechanism includes a drive motor 22 having a drive pinion 23. Two step-down gears are employed, a first gear 24 having a pinion 25 and a second gear 26 having a pinion 27. The pinion 27 meshes with gear teeth 28 on a cycling member 30 rotatable on a stub shaft 31. The cycling member, and indeed the other elements of the drive train may, if desired, be molded of durable plastic.

For engaging the cap 12 of the container for discharge, an actuating arm 40 is provided, pivoted for rocking movement about a stub shaft 41 and having a cam follower 42 at the end. The latter rides upon the surface of snail-shaped cam 43 which is integrally formed with the cycling member 30.

Projecting downwardly from the arm, and integral therewith, is a lug or finger 44, the latter being centered with respect to the locating surface 14 for accurate engagement of the cap 12 on the container. A biasing spring 45 connected to an integral bracket 46 on the arm and anchored to the frame at 47, serves to bias the arm downwardly, keeping the cam follower 42 in engagement with the cam and exerting sufficient force to overpower the valve in the container.

The motor 22 is of the miniaturized DC type employing permanent field magnets and designed for efficient operation on a 3-volt supply. Current for the motor is supplied by a battery 48 which occupies the right-hand portion of the housing and which may consist of two readily available type-D cells.

In operation, rotation of the cycling member 30 from position 30a (FIG. 1) in a clockwise direction causes the cam follower to reach a point of dropoff 30b, (FIG. 4) subsequently dropping into a valley 30c, with the arm swinging downwardly for engagement between the finger 44 and the cap 12 of the container to initiate discharge. Continued rotation of the cycling member 30 causes the cam follower to ride up along the sloping portion 30d of the cam, as shown in FIG. 5, back into the reference position illustrated in FIG. 1 to complete the discharge cycle.

For producing an inactive or standby period of a selected length on the order of 15 minutes or more, a timing circuit is provided including a cycling switch which is integral with the cycling member 30. In one version of such switch, shown in FIG. 3, contacts 61, 62 are provided which ride in engagement with a sector 63 of conductive material secured to the backside of the cycling member 30 and having a leading edge 64 and a trailing edge 65. After the cycling member 30 begins to rotate, the leading edge 64 engages the contacts to complete the circuit. Upon continued rotation of the cycling member, the trailing edge 65 is reached, thereby breaking the circuit which results in turning off the motor. In an alternate form of switching arrangement shown in FIG. 3a, leaf spring contacts 61a, 62a are provided having an actuating pin which engages a land surface 63a bounded by a leading edge 64a and trailing edge 65a. The leading and trailing edges are defined by an integrally formed depression 66a having a helically formed bottom surface for engaging the pin. Regardless of which form of switch is used, contact is made at about 133° from the reference position of the cycling member and persists until the 353°-phase position is reached. In FIGS. 1, 4 and 5 the first embodiment of the switch is shown for the purpose of more clearly illustrating the operation.

Turning now to the timing circuitry 70 shown in FIG. 6, an RC time-measuring circuit is provided consisting of a capacitor C and a resistor R1, effectively connected in series between the upper, or positive bus 71 and the lower, or negative bus, 72. Interposed between the capacitor C and the negative bus is a resistor 73 which, as will be shown, permits the switch 60 to perform a commutating function. The junction point between the resistor R1 and the capacitor C, which is designated as point "A," is connected to the input, or base, circuit of an input transistor Q1. A resistor R2 is interposed, serving as the input resistor for the transistor stage. The resistor R2, combined with the input resistance of the transistor, performs, with capacitor C, an alternate timing function permitting prompt restoration of the capacitor C to its initial, or reference, state of charge.

The output, or collector-emitter, circuit of the transistor Q1 is coupled to the input, or base, circuit of a second transistor Q2 via a resistor 74. The collector of the transistor Q2 is direct coupled to the base of an output transistor Q3. The motor 22 is connected in series with the emitter-collector circuit of the transistor Q3.

For the purpose of providing decisive switching when the control voltage applied to the transistor Q1 reached the threshold of conduction, a positive feedback resistor 76 is connected from a point between the transistors Q2, Q3, and which is designated "B" in the drawing, to the left-hand terminal of the timing capacitor C. Moreover, for making the circuit insensitive to induced voltage transients, which might cause premature triggering, a capacitor 77 is connected from the base of the transistor Q2 to its collector terminal. This capacitor not only tends to stabilize the base-collector voltage against transient changes but cooperates with resistor 74 to perform an integrating or filtering function to prevent feedback of transients to the capacitor C.

In a practical case the commutating resistor 73 may have a resistance on the order of 10,000 ohms, the capacitor C may have a capacitance on the order of 68 microfarads, the timing resistor R1 may have a resistance on the order of 18 to 20 megohms and the alternate timing, or input, resistor R2 may have a resistance on the order of 4,700 ohms. The resistor 74 may have a resistance on the order of 47,000 ohms, the resistor 76 a resistance on the order of 10,000 ohms and the capacitor 77 a capacitance on the order of 0.22 microfarad. The detection transistor Q1 should preferably be of a type having a high gain, i.e., requiring only a small amount of base current to turn it on, inasmuch as such transistor receives only base current through the timing resistor R1 which is of extremely high resistance. Thus such transistor may, for example, be of the type 2N3565. The remaining transistors may be of the type 2N4248 and 2N3568 respectively.

Figure 8:
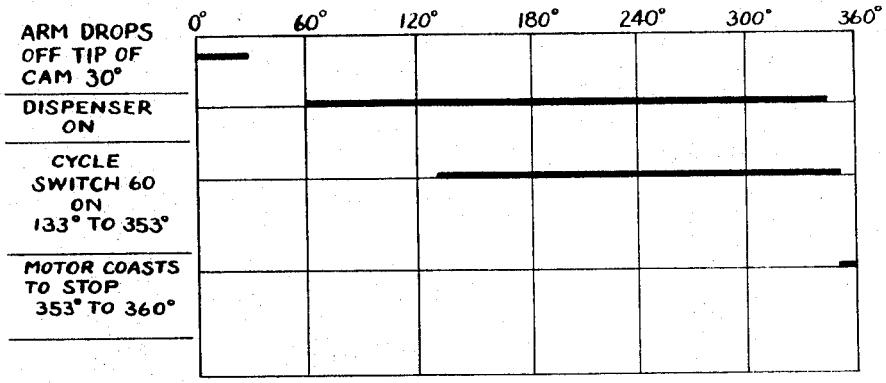
FIG. 8 is a diagram showing the timing of the mechanism expressed in terms of a complete revolution of the cycling member.

The operation of the device can be understood with special reference to FIGS. 7 and 8, taken in connection with FIG. 6. It will be assumed that the switch 60 has just been opened after a closure during which the capacitor has charged itself via a resistor R2 and the base-emitter circuit of transistor Q1. Because of the base-emitter drop, which is on the order of one-half volt the capacitor charges to a reference condition of 2.5 volts DC in the negative sense, as indicated at the left-hand side of diagram 80 (FIG. 7). After the switch 60 is opened, by final movement of the cycling member 30 at the end of the discharge portion of the cycle, the RC circuit consisting of capacitor C and resistance R1, with the commutating resistor 73 in series, is in the timing mode across the voltage supply terminals 71, 72. Since the charge in the capacitor is poled oppositely to the polarity of the supply, the charge leaks off of the capacitor through the timing resistor at an extremely slow and predictable rate until a point 82 is reached where the capacitor has lost all of its charge. The capacitor then begins to charge in the opposite direction until the voltage reaches a point 83 which is at the threshold of conduction for transistor Q1 and which may be on the order of half a volt. Since the output circuit of transistor Q1 is in series with the emitter base circuit of transistor Q2, conduction in transistor Q1 induces flow of base current turning transistor Q2 on. The emitter-collector, or output circuit of transistor Q2 is, in turn, connected to the base of the output transistor Q3 so that the flow of base current in the latter makes the transistor conductive thereby turning on the motor 22. The positive voltage applied by the feedback resistor 76 via the capacitor to the base of Q1 when the transistor Q2 becomes conductive augments the positive control voltage to avoid any indecisiveness at the threshold of conductive. Turning on of the motor causes the cycling member 30 to begin to rotate from the reference position illustrated in FIG. 1 until the point of dropoff 30b of the cam is reached thereby releasing the arm 40 which engages the cap of the dispenser, as shown in FIG. 4, for discharge. Continued rotation of the cycling member 30 (to a point 133° from reference position) brings the conductive sector 63 (see FIG. 3) into engagement with the contacts 61, 62, closing the switch 60 and connecting the left-hand side of the capacitor C to the positive bus 71. The point of switch closure is indicated at 84 in the diagram, FIG. 7.

Since the voltage across the capacitor cannot change instantaneously, connection of the left-hand side of the capacitor to the positive bus causes the voltage at point A on the right-hand side of the capacitor to jump immediately to 3 volts positive as indicated at point 85 (FIG. 7). The effect of closing the switch, in addition to switching the RC circuit, is to further clamp the transistor Q1, and hence the transistors which follow it, in the conducting state. It is to be noted that closure of the switch 60 does not create any short circuit condition because of the voltage drop in the resistor 73 which is in series with it.

After the switch is closed, the capacitor C accumulates a charge so that the voltage at point A drops from its peak value 85 along an exponential curve 86 to a low value 87 which approaches the control voltage which was initially effective to start conduction. By this time the cycling member 30 has rotated around to the point where the trailing edge 65 of the conductive sector leaves the contacts 61, 62 to open the switch 60. Such opening of the switch, which occurs at point 88, causes the voltage at point A on the capacitor to immediately assume a level of negative 2.5 volts. This stops conduction in transistor Q1 which turns off Q2. This effectively opens the base circuit of transistor Q3, shutting off the motor 22. The motor, after shutoff, coasts slightly, as indicated in FIG. 8, to bring the cycling member back to its initial condition shown in FIG. 1.

Opening of the switch 60 effectively switches the timing resistor R1 into series RC relationship with the capacitor C to begin a new long timing cycle.

For initiating discharge of the device at any time during standby for test purposes, a pushbutton is provided which artificially applies, to the transistor circuitry, a voltage adequate to trigger conduction. This is accomplished in the present instance by connecting a pushbutton 90 from the positive bus 71, via a resistor 91, to the connection B between the transistors Q2, Q3. Such positive voltage, applied to the base of transistor Q3 causes such transistor to become conductive, turning on the motor 22. Simultaneously, the positive voltage from the pushbutton, fed backwardly in the circuit through the feedback resistor 76, and acting through capacitor C, causes the control point A to become positive to initiate conduction, more or less simultaneously, in transistors Q1, Q2 as well. After the motor has rotated the cycling member 30 through a small arc, closure of the switch 60 occurs, following which the motor completes its cycle just as described in FIG. 7. A diode 92 provides isolation in the face of transients.

It will be apparent that the above automatic dispenser, including its control circuitry, aptly fulfills the objects of the invention set forth above. Reliable and consistent operation over long time intervals, depending upon the value of resistance R1, may be achieved at low voltage and using reasonable values of capacitance and low-cost components. Since all three of the transistors are nonconductive during the standby periods, the current drawn during standby is substantially zero. Because of the ramp formation of the cam surface 43, energy is stored in the spring 45 at a gradual rate thereby avoiding any peak loading upon motor 22. The motor cycle occupies approximately 3½ seconds which is adequate for most purposes, and it will be apparent to one skilled in the art that the motor cycle, and timed period of standby may be lengthened or shortened simply as a matter of design and without departing from the teachings of the invention.

Automatic aerosol dispensers of the type described may be used wherever a timed intermittent discharge is desired for a wide variety of aerosol agents including deodorizing or perfuming agents, bactericidal agents and the like. The container may be of the conventional type or of the "metered valve" type in which a measured amount of aerosol is discharged each time the valve plunger is depressed, the latter being preferred.

We claim as our invention:

1. In an aerosol dispenser for operating the valve of an aerosol container automatically at relatively low time intervals, the combination which comprises a source of low voltage, a motor, means including a cam operated by the motor for unseating the valve on the container, a switch coupled to the cam for closing incident to operation of the valve, a timing resistor and detector connected in series across the source, the detector being in the form of a solid state device having an input circuit and an output circuit, the resistance of the timing device being greater by a large factor than the resistance of the detector input circuit, an amplifier connected to the detector output circuit for operating the motor, a timing capacitor having one terminal connected to the junction of the timing resistor and detector, a commutating circuit including the switch and a switch resistor connected in series with one another across the source, the remaining terminal of the capacitor being connected to the junction between the switch and the switched resistor so that when the switch is open the timing resistor and timing capacitor are effectively connected in series across the source forming a long time constant RC circuit for triggering of the detector after a relatively long time delay and so that when the switch is closed by operation of the motor, the timing capacitor is effectively connected in series with the detector circuit forming an RC circuit of relatively short time constant for promptly restoring the capacitor to a reference condition.

2. The combination as claimed in claim 1 in which a feedback circuit is connected from the amplifier to the circuit of the timing capacitor for applying a positive feedback voltage to the input of the detector thereby to avoid any condition of indecision as the detector reaches the threshold of conduction.

3. The combination as claimed in claim 1 in which a feedback circuit is connected from the amplifier to the switched terminal of the capacitor for applying a positive feedback voltage to the input of the detector thereby to avoid any condition of indecision as the detector reaches the threshold of conduction, and means including a capacitor associated with the feedback circuit for inhibiting passage of induced transient impulses.

4. In a cyclically operated aerosol dispenser for operating the valve of an aerosol container at relatively long time intervals comprising, in combination, a low-voltage battery, a motor means including a cam driven by the motor for operating the valve of the aerosol dispenser and having a switch which is closed incident to operation of the valve, a timing resistor, a detector including a solid-state device of high gain having an input circuit and an output circuit, the timing resistor and the detector input circuit being connected in series across the source, a solid state amplifier coupled to the detector output circuit for driving the motor, a timing capacitor connected to the junction between the timing resistor and the detector input circuit, and means including said switch for effectively commutating the remaining terminal of the capacitor from one side of the battery to the other to produce charging of the capacitor through the input circuit of the detector during the time that the switch is on and for discharging the capacitor through the timing resistor during the time that the switch is off, the resistance of the timing resistor many times greater than the resistance of the detector input circuit to provide relatively long time delay on the order of many minutes between the successive actuations of the motor.

5. The combination as set forth in claim 4 in which the detector is polarized to be unresponsive to the polarity of the voltage on the timing capacitor when the capacitor is connected for discharge through the timing resistor but responsive to the buildup in voltage accompanying buildup of charge in the opposite direction.

6. In a timer for an aerosol dispenser having a motor and a cam for operating the valve of an aerosol container together with a cycling switch which is operated incident to operation of the valve, comprising, in combination, a low-voltage battery, a timing resistor and a detector connected in series across the source, said detector including a solid-state device of high gain having an input circuit and an output circuit, a solid state amplifier coupled to the output circuit for driving the motor, the detector and amplifier being nonconductive when the motor is turned off, a timing capacitor having one terminal connected to the junction between the timing resistor and the detector circuit, said capacitor having its other terminal arranged for connection to the switch so that the capacitor is commutated between the terminals of the source, the resistance of the timing resistor being greater by a large factor than the resistance of the input circuit of the detector to provide a long standby period during which substantially no current is drawn from the battery.

7. An aerosol dispenser comprising, in combination, a low-voltage battery, a motor, a cam driven by the motor for operating the valve of the aerosol container, switching means coupled to the cam for actuation during the time that the valve is operated, a source of low voltage, a timing resistor and detector circuit connected in series across the source, said detector circuit including a solid state device having an input circuit and an output circuit, an amplifier coupled to the output circuit for driving the motor, a timing capacitor connected to the junction between the timing resistor and the detector circuit and to the switching means so that the capacitor is effectively commutated between the terminals of the source, the timing resistor having a resistance which is higher by a large factor than the resistance of the detector to provide a relatively long interval on the order of many minutes between the successive cycles of operation of the valve of the aerosol container.

8. The combination as claimed in claim 7 in which the detector includes a rectifying junction poled to present a high resistance during the time that the timing capacitor is discharging into the timing resistor but to pass triggering current when the capacitor begins to charge in the opposite direction.

9. The combination as claimed in claim 7 in which the detector is in the form of a transistor of high gain having a resistor in series with the input circuit.

10. In a cyclically operated aerosol dispenser for operating the valve of an aerosol container at relatively long time intervals comprising, in combination, a low-voltage battery, a motor, a cycling member, a speed-reducing gear train interposed between the motor and the cycling member, the cycling member having a snail-shaped cam thereon, a cam follower arm engaging the cam and having a biasing spring so that when the point of dropoff is reached on the cam the arm is released for engagement with the valve of the aerosol container, an RC timing circuit including a timing capacitor and timing resistor, a detector including a solid-state device of high gain having its input circuit coupled to the capacitor for responding to the voltage of the capacitor which exists following a long time interval, a solid state amplifier coupled to the output of the detector for driving the motor, and means including a switch on the cycling member phased for operation during the time that the cam follower arm is riding upwardly on the surface of the cam for connecting the capacitor to the battery for acquiring of a reference potential and for turning off the detector and motor in readiness for response following expiration of a successive long time interval.

11. The combination as claimed in claim 10 in which the motor is of the DC type having permanent field magnets, in which the solid state amplifier includes transistors, and in which the battery is insertable between terminals, the combination further including test means including a switch for applying triggering voltage from a terminal of the battery to the input terminal of one of the transistors to produce conduction therein to produce cycling of the motor.